United States Patent [19]

Belcher

[11] Patent Number: 5,057,266

[45] Date of Patent: * Oct. 15, 1991

[54] METHOD OF MAKING A HOLLOW POLYETHYLENE TEREPHTHALATE BLOW MOLDED ARTICLE WITH AN INTEGRAL EXTERNAL PROJECTION SUCH AS A HANDLE

[75] Inventor: Samuel L. Belcher, Cincinnati, Ohio

[73] Assignee: Sabel Plastechs, Inc., Cincinnati, Ohio

[ * ] Notice: The portion of the term of this patent subsequent to Feb. 12, 2008 has been disclaimed.

[21] Appl. No.: 424,400

[22] Filed: Oct. 20, 1989

Related U.S. Application Data

[62] Division of Ser. No. 222,186, Jul. 21, 1988, Pat. No. 4,993,931.

[51] Int. Cl.$^5$ .................. B29C 45/14; B29C 49/20
[52] U.S. Cl. .................... 264/513; 425/112; 425/129.1; 425/525
[58] Field of Search .............. 425/525, 528, 532, 533, 425/112, 121; 264/513, 248, 250, 251, 259, 266, 531, 534

[56] References Cited

U.S. PATENT DOCUMENTS

| Re. 3,116 | 9/1868 | Atterbury et al. |
| 3,744,656 | 7/1973 | Shiemann |
| 4,170,623 | 10/1979 | Dubois et al. |
| 4,280,805 | 7/1981 | Hafele |
| 4,368,826 | 1/1983 | Thompson |
| 4,378,328 | 3/1983 | Przytulla et al. |
| 4,659,531 | 4/1987 | Ezaki |
| 4,713,207 | 12/1987 | Udell et al. |
| 4,727,997 | 3/1988 | Nakamura et al. |

FOREIGN PATENT DOCUMENTS

| 3443715 | 11/1984 | Fed. Rep. of Germany |
| 52-3662 | 8/1977 | Japan |
| 60-147319 | 8/1985 | Japan ............ 264/516 |
| 60-154021 | 8/1985 | Japan |
| 63-226621 | 1/1986 | Japan |
| 1122516 | 8/1968 | United Kingdom |

OTHER PUBLICATIONS

Article entitled, "A New Process for Producing Plastic Drums with an Integrally Molded Handling Ring", pp. 818–820 of Conference Proceedings of ANTEC 88.

Primary Examiner—Jan H. Silbaugh
Assistant Examiner—Catherine Timm
Attorney, Agent, or Firm—Wood, Herron & Evans

[57] ABSTRACT

A method of making a hollow polyethylene terephthalate (PET) blow molded article with an integral external projection such as a handle. The method includes blow molding the hollow article and then injection molding the integral projection.

5 Claims, 2 Drawing Sheets

METHOD OF MAKING A HOLLOW POLYETHYLENE TEREPHTHALATE BLOW MOLDED ARTICLE WITH AN INTEGRAL EXTERNAL PROJECTION SUCH AS A HANDLE

This is a division of application Ser. No. 07/222,186, filed July 21, 1988 now U.S. Pat. No. 4,993,931.

BACKGROUND OF THE INVENTION

The present invention is directed to a method of making a hollow article having an integral projection extending from a wall thereof, such as, a bottle with an integral handle thereon, in which both the hollow article and integral projection are fabricated of polyethylene terephthalate (PET).

There is a continuous demand for PET articles such as bottles, buckets, pitchers, cylinders, funnels, etc., because they are relatively inexpensive, easy to use and generally non-breakable. It is oftentimes desirable that articles of large size have handles thereon to aid in their use. U.S. Pat. No. 4,713,207 discloses a method of making a plastic container with an integral handle member thereon. The method disclosed includes the step of extruding a thermoplastic parison between sections of a mold and then blowing the container. Since it is generally understood that PET does not have sufficient hot melt strength to be extrusion blow molded, however, other thermoplastic materials, such as high density polyethylene and polyvinyl chloride, must be used to produce blow molded containers where the handle is integral with the container.

When PET is used and handles are desired, it has been the practice to attach the handle to the PET article in a separate operation, such as by ultrasonic fusion, after the blow molded PET article has been formed in and removed from the blow mold. Another approach has been to injection mold a thermoplastic handle in an operation separate and apart from the blow molding of the container, and snap the separately molded handle over the neck or finish of the blown PET bottle. In accordance with a still further proposal, the separately molded handle is inserted in the blow mold and the bottle is blown over/into the handle. None of these practices, however, has been entirely satisfactory since they add steps to the fabrication process, may require ultrasonic bonding equipment, and are otherwise unduly time-consuming and expensive.

SUMMARY OF THE INVENTION

The present invention is directed to a method of making articles of polyethylene terephthalate (PET), and more particularly to a method of making a blow molded PET article, for instance, a bottle, with an integral PET projection, such as a handle or foot, extending from a wall thereof. Since both the bottle and handle or foot are made of PET, they both possess the superior characteristics of this material and recycling is facilitated.

In essence, in the method of this invention, a PET preform is inserted into a combination blow mold and injection mold wherein the blow mold cavity defines the article to be blown and the injection mold cavity defines the projection therefrom. The injection mold cavity and the blow mold cavity are in communication with each other at at least one location defining the area where the handle or foot is to extend from the container. The "preform" may be a co-extruded, co-injected, or straight injection molded or fabricated PET preform. After insertion into the combination mold, the preform is injected with blow gas from a gas nozzle to conform the preform to the blow mold cavity, thereby forming the hollow blow molded article. Prior to blowing the preform in the blow mold cavity, the preform temperature is established at its stretch orientation temperature, which is well known for PET to be in the range of 195° F. to 240° F. The preform may be one previously made on another machine which is heated to the stretch orient temperature range in a separate heating operation prior to insertion in the blow mold, or it may be a previously injection molded PET preform (as on a single-stage PET machine) that has cooled to the appropriate stretch orientation temperature immediately prior to insertion in the blow mold cavity. While the pressure of the blow gas holds the preform in conformity with the blow mold cavity, and prior to exhausting the blow gas, molten PET is injected under pressure into the injection mold cavity to form the integral protrusion or handle and bond it to the blown preform article at the point where the injection mold cavity communicates with the blow mold cavity. The combination mold is then opened and the finished article is removed. Because the handle and container are both PET and the injected PET is molten when injected into the injection mold cavity, the injection molded projection, or handle, fuses to the hollow blown article without need for ultrasonic bonding, adhesive, snap-on fittings or the like.

DETAILED DESCRIPTION OF THE INVENTION

Figure 1:
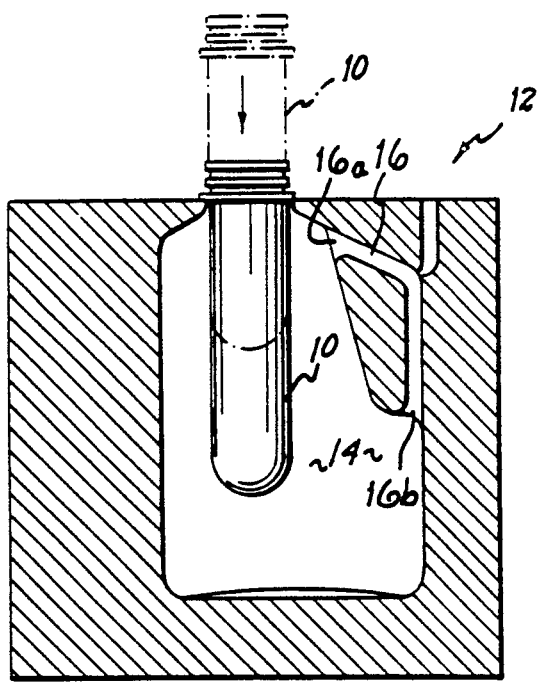
FIG. 1 is a cross sectional view of the combination blow mold and injection mold with the preform (shown partially in phantom) being inserted therein.

FIG. 1 shows a preform 10 (partially in phantom) being inserted into blow mold cavity 14 of combination blow mold and injection mold 12. Combination mold 12 consists of a blow mold cavity 14 having a configuration which corresponds to the desired shape of the hollow article body 31 (shown in FIG. 4) and an injection mold cavity 16 conforming to the desired shape of the projection or handle 32. Injection mold cavity 16 communicates at upper and lower ends 16a and 16b with the interior of the blow mold cavity 14 at the points where the projection extends from a wall of the hollow article. PET preform 10 may be formed by one of a number of known techniques such as are disclosed in U.S. Pat. Nos. 4,151,250, 4,153,667, and 3,781,395. The preform is either heated to the appropriate stretch orientation temperature of between about 195° F. and 240° F. prior to insertion in the mold utilizing conventional techniques well known in the blow molding art, or it may reach the appropriate stretch orientation temperature by cooling after being injection molded on a single stage PET machine. It will be appreciated that preform 10 need not be of the shape shown in FIG. 1.

Figure 2:
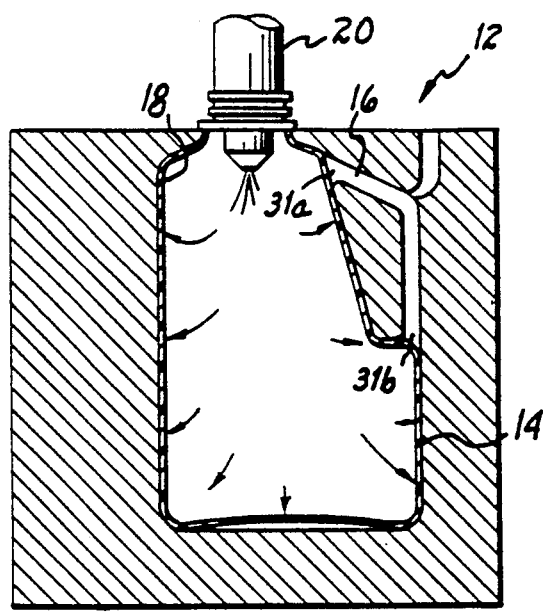
FIG. 2 shows the preform being expanded by blow gas to conform to the blow mold cavity.

Once preform 10 has been inserted into blow mold cavity 14 and combination mold 12 has been closed therearound, by any suitable means, blow gas injection means (shown generally as 20 in FIG. 2) is inserted into and injects blow gas into preform 10 such that preform 10 conforms to the shape of blow mold cavity 14 (also shown in FIG. 2). The blow gas is injected at a pressure of between about 100 psi and about 750 psi and at a temperature of between about 40° F. and about 120° F. At this point the exterior wall of article 31 communicates with the ends 16a and 16b of the injection mold cavity 16 at points 31a and 31b.

Figure 3:
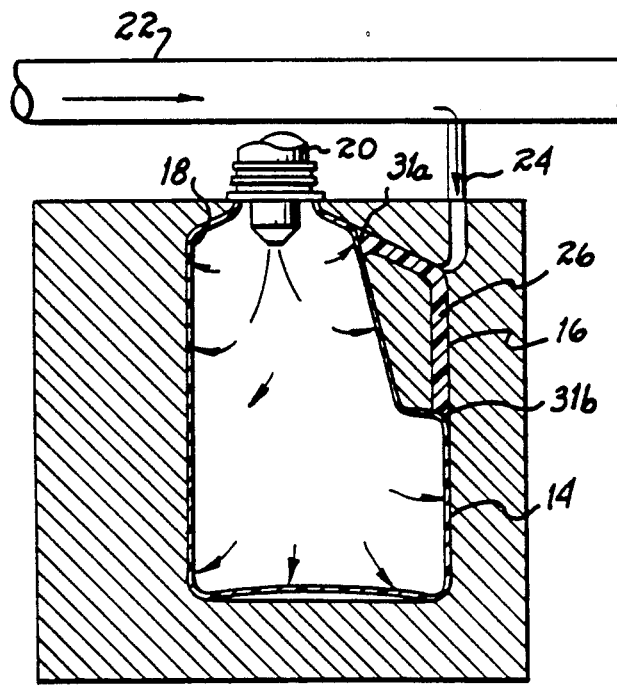
FIG. 3 shows the injection molding of the integral handle while pressure holds the article against the blow mold wall.

In FIG. 3 there is shown a PET injection melt stream 22 which carries molten PET flowing in the direction of the arrow. The molten PET, which is at a temperature above 485° F., is injected through injection nozzle means (shown generally as 24) into injection mold cavity 16 while blown preform 18 is conformed to blow mold cavity 14 by the blow gas. In this way, the injection molded handle 26 directly fuses or bonds to blown PET article 18 at points 31a and 31b proximate injection mold cavity ends 16a and 16b. Standard injection molding apparatus and procedures, which are well known in the art for producing PET preforms, are used in the injection molding step of this invention.

Figure 4:
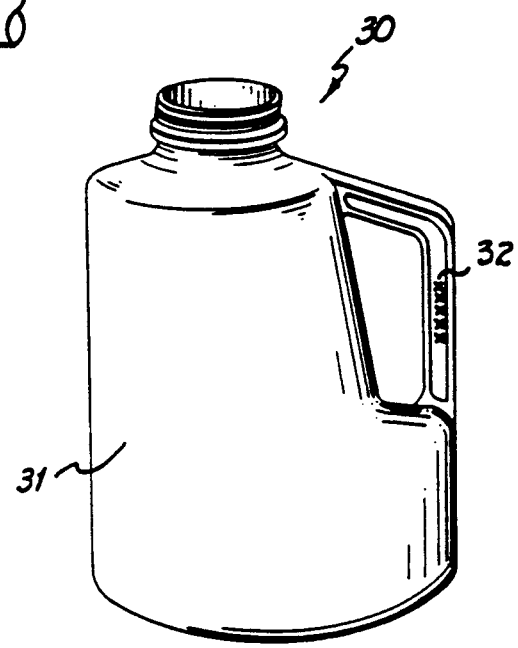
FIG. 4 shows a finished blow molded bottle with an integral injection molded handle.

FIG. 4 shows a finished blow molded bottle with an integral injection molded handle 30. The article is free of injection molded rings encircling it and passing through the points 31a and 31b where the projection bonds to the wall of the bottle. As will be appreciated, since the handle or projection is injection molded, it may have any suitable cross-section, including cored, and may be of any suitable size. In addition, if desired, a name or identification symbol can be molded into the injection molded handle as indicated at 32 by including such name or symbol in the injection mold cavity 16. Furthermore, since the handle is injection molded it may be made from recycled or regrind PET. Finally, the handle may be clear or colored or crystallized.

Figure 5:
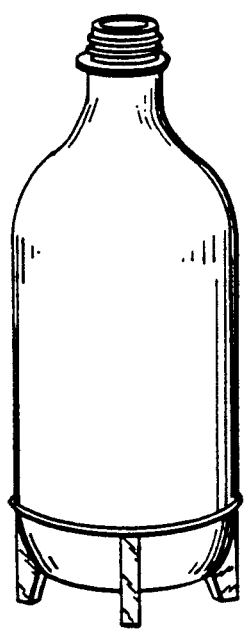
FIG. 5 shows a finished blow molded container with an integral injection molded foot.
Figure 6:
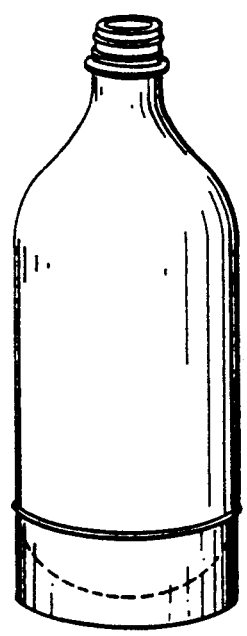
FIG. 6 shows a finished blow molded container with an integral injection molded base structure.

It will be appreciated by those skilled in the art that the method of the present invention is adaptable to produce a wide variety of PET articles with integral PET projections thereon, one example of which is a blow molded bottle with an integral handle connected to that bottle at two points as is shown in FIGS. 1-4. Other products include, but are not limited to, funnels, buckets, pitchers, cylinders, etc. Any of the above articles may have a handle attached at two points (as shown in the FIGS.) or at one point so that it functions as a hook, or they may have a base structure or feet injection molded thereon. An example of a blow molded container having an injection molded foot is shown in FIG. 5 and an example of a blow molded container having an injection molded base structure is shown in FIG. 6. The projection can be attached to the article in a variety of positions, such as the bottom, side, or upper end. For example, a handle on the bottom of a bottle can be provided to facilitate hanging the bottle upside down for drainage or other purposes. In addition, multiple feet can be injection molded onto the lower end of the blow molded article using the method of this invention to provide a stable base or support.

It will be further understood that the method disclosed herein is adaptable to injection mold an integral external projection on a previously blow molded hollow article. In accordance with this approach, the previously blow molded PET article is inserted in mold 14, gas pressure is applied to hold the external wall of the article against the mold, and the handle 16 injected and bonded to the container in the manner previously disclosed. The previously blow molded article has a shape conforming to the blow mold cavity 14.

The preferred embodiment of the method and apparatus of this invention has been described in connection with bonding a PET handle to the outside wall of a blow molded PET container by injecting the handle onto and/or against the outside wall of the blow molded container while the blow molded container is still in the mold and the blow gas pressure is still applied. It is also contemplated that the PET handle can be bonded to the outside of a blow molded PET container which has been previously blown and removed from the blow mold cavity. More particularly, it is contemplated that a previously blown PET container can be placed on a fixture which internally supports, with an anvil or mandrel, that portion of the wall of the PET container to which the handle is to be attached. With the container so supported and the injection mold cavity located to position the ends thereof, 31a and 31b, adjacent the outside surface of the container behind which the anvil or mandrel is located, the molten PET material is injected into the injection mold handle cavity to bond to the supported wall portions of the container. With this approach, the blow molded container need not be located in the blow mold cavity and/or under internal gas pressure at the time the injection molded handle is bonded to the external wall of the container. Additionally, the blow molded container can be at room temperature, that is "cold", at the time the injection molded handle is bonded to the exterior wall of the container.

While the invention has been described in detail with respect to a preferred embodiment thereof, it will be understood by those skilled in the art to which the invention pertains that numerous changes may be made in the invention without departing from the spirit and scope thereof.

What is claimed is:

1. A method of making a hollow blow molded article of polyethylene terephthalate having an integral injection molded polyethylene terephthalate projection bonded to and extending from an exterior wall section thereof which is free of injection molded rings encircling the article and passing through the point where the projection bonds to the exterior wall section thereof, comprising the steps of:

(a) blow molding a hollow article of polyethylene terephthalate;
   (b) inserting said hollow blow molded article of polyethylene terephtalate into a hollow article-defining blow mold cavity of a combination blow mold and injection mold having a projection-defining injection mold cavity which is physically separate and independent from the blow mold cavity except for communicating at an interface therebetween, wherein the hollow article-defining blow mold cavity has an interior wall surface which corresponds to the exterior surface of the hollow blow molded article other than at said interface whereat the projection is to be bonded to the exterior wall section of the article, the projection-defining injection mold cavity defines the projection extending from said exterior wall section of the article, and the interface whereat the blow mold and injection mold cavities are in communication with each other corresponding to the location on the article wall from which the projection extends;
(c) closing the combination mold;
(d) injecting gas into the interior of said hollow blow molded article when said combination mold is closed to hold said location on said wall of said hollow article proximate said interface whereat the blow mold and injection mold cavities are in communication with each other;
(e) injection molten polyethylene terephthalate into the injection mold cavity while the gas is injected into the interior of the hollow article to form the integral injection molded projection bonded to said wall of the hollow blow molded article at the interface whereat the injection mold cavity communicates with the blow mold cavity;
(f) opening the combination mold; and
(g) removing the hollow blow molded article with integral injection molded projection from the combination mold.

2. A method of making a hollow blow molded article of polyethylene terephthalate having an integral injection molded polyethylene terephthalate projection bonded to and extending from an exterior wall section thereof which is free of injection molded rings encircling the article and passing through the point where the projection bonds to the exterior wall section thereof, comprising the steps of:
(a) inserting a previously blow molded hollow article of polyethylene terephthalate into a hollow article-defining blow mold cavity of a combination blow mold and injection mold having a projection-defining injection mold cavity which is physically separate and independent the blow mold cavity except for communicating at an interface therebetween, wherein the hollow article-defining blow mold cavity has an interior wall surface which corresponds to the exterior surface of the hollow blow molded article other than at said interior whereat the projection is to be bonded to the exterior wall section of the article, the projection-defining injection mold cavity defines the projection extending from said exterior wall section of the article, and the interface whereat the blow mold and injection mold cavities are in communication with each other corresponding to the location on the article wall from which the projection extends;
(b) closing the combination mold;
(c) injecting gas into the interior of said hollow blow molded article when said combination mold is closed to hold said location on said wall of said hollow article proximate said interface whereat the blow mold and injection mold cavities are in communication with each other;
(d) injecting molten polyethylene terephtalate into the injection mold cavity while the gas is injected into the interior of the hollow article to form the integral injection molded projection bonded to said wall of the hollow blow molded article at the interface whereat the injection mold cavity communicates with the blow mold cavity;
(e) opening the combination mold; and
(f) removing the hollow blow molded article with integral injection molded projection from the combination mold.

3. The method of claim 1 or 2 wherein said integral injection molded projection is a handle.

4. The method of claim 1 or 2 wherein said integral injection molded projection is a base cup.

5. The method of claim 1 or 2 wherein said integral injection molded projection is a base structure having a plurality of feet.

* * * * *